US007680913B2

(12) United States Patent
Bhatia et al.

(10) Patent No.: US 7,680,913 B2
(45) Date of Patent: Mar. 16, 2010

(54) MECHANISM TO ENFORCE AVAILABILITY PREFERENCES AND NEEDS OF USER RESOURCES HOSTED BY TELECOMMUNICATION NETWORKS

(75) Inventors: Randeep Bhatia, Green Brook, NJ (US); Jorge Lobo, New York, NY (US); Guda Venkatesh, West Orange, NJ (US); Alan Quayle, Berkely Heights, NJ (US)

(73) Assignee: Cisco Technology, Inc., San Jose, CA (US)

( * ) Notice: Subject to any disclaimer, the term of this patent is extended or adjusted under 35 U.S.C. 154(b) by 1133 days.

(21) Appl. No.: 10/289,146

(22) Filed: Nov. 6, 2002

(65) Prior Publication Data

US 2003/0097403 A1 May 22, 2003

Related U.S. Application Data

(60) Provisional application No. 60/345,176, filed on Nov. 7, 2001.

(51) Int. Cl.
*G06F 15/16* (2006.01)
*G06F 15/173* (2006.01)

(52) U.S. Cl. ....................... 709/223; 709/204; 709/206; 709/226; 709/229

(58) Field of Classification Search ................. 709/223, 709/203
See application file for complete search history.

(56) References Cited

U.S. PATENT DOCUMENTS

| | | | | |
|---|---|---|---|---|
| 6,138,158 | A | 10/2000 | Boyle et al. | 709/225 |
| 6,446,136 | B1 | 9/2002 | Pohlmann et al. | 709/318 |
| 6,578,076 | B1 * | 6/2003 | Putzolu | 709/223 |
| 6,697,840 | B1 * | 2/2004 | Godefroid et al. | 709/205 |
| 6,910,074 | B1 * | 6/2005 | Amin et al. | 709/227 |
| 6,917,981 | B1 * | 7/2005 | Buck et al. | 709/224 |
| 2002/0024947 | A1 * | 2/2002 | Luzzatti et al. | 709/203 |
| 2002/0078150 | A1 * | 6/2002 | Thompson et al. | 709/204 |
| 2002/0194325 | A1 * | 12/2002 | Chmaytelli et al. | 709/224 |
| 2003/0028621 | A1 * | 2/2003 | Furlong et al. | 709/219 |
| 2003/0060188 | A1 * | 3/2003 | Gidron et al. | 455/408 |
| 2004/0098491 | A1 * | 5/2004 | Costa-Requena et al. | 709/229 |

* cited by examiner

*Primary Examiner*—Hassan Phillips
(74) *Attorney, Agent, or Firm*—Baker Botts L.L.P.

(57) ABSTRACT

A method and a system are disclosed for making available telecommunication network resources associated with network subscribers and exposed by a Network Service Gateway (NSG) to clients of the NSG services based on stored subscriber availability preferences. The method and system can be implemented using an availability Policy Server that sits next to or inside of the NSG. The Policy Server interprets the stored availability preferences of subscribers in response to requests for subscriber information. These availability preferences are translated into a low-level policy rule language. The Policy Server implements a policy rule evaluator to evaluate policies written in this language. Policies written in the low-level language are referred to as aPolicies (availability policies). An aPolicy receives as input a stream of events. Based on these events, the aPolicy may decide to take one or more actions. The NSG or clients of the NSG will carry out the execution of the actions.

15 Claims, 6 Drawing Sheets

MECHANISM TO ENFORCE AVAILABILITY PREFERENCES AND NEEDS OF USER RESOURCES HOSTED BY TELECOMMUNICATION NETWORKS

CROSS REFERENCE TO RELATED APPLICATIONS

This application claims the benefit under 35 U.S.C. 119(b) of U.S. Provisional Patent Application Ser. No. 60/345,176, filed on Nov. 7, 2001, entitled "Mechanism To Enforce Availability Preferences And Needs Of User Resources Hosted By Telecommunication Networks."

BACKGROUND

1. Field of Invention

The present invention relates to processes that support the enforcement of preferences for the availability of subscriber resources hosted by telecommunication networks, and especially mobile telephone networks and networks with multimedia capability. In particular, the invention pertains to processes for deciding when, where, how and to whom such resources will be available.

2. Description of Prior Art

Operators of fixed land telephone networks, mobile telephone networks and other telecommunication networks, including those with multimedia capability, are interested in providing mechanisms to expose the many intrinsic resources that reside inside the networks. These resources include information about the presence and location of subscribers, billing services, etc. This exposure will enable application providers to quickly and easily develop applications that make use of these resources and introduce services providing new revenue sources to the network operators. The path that many operators are taking to open up their networks, while pursuing the goal of ensuring compatibility of applications crossing multiple networks, has been to standardize access to network resources via APIs accessible from Network Service Gateways. However, much of the data and resources exposed by the Network Service Gateways directly concerns subscribers. Subscribers will be very reluctant to embrace any application that uses their presence and location if there are no security and privacy guarantees on who is allowed to make use of the data.

There already exist a variety of mechanisms to control the exposure of certain information coming from the networks. For example, one can make a telephone number private to conceal the telephone number from caller identification exposure. Another example is presence information in Instant Messaging (IM) Systems. Subscribers can set their presence to "invisible" so that others cannot see the presence of the subscriber in the system. A limitation of these models is that a subscriber is restricted to exposing the information in the same way to all interested parties. A telephone number is private to all caller identification recipients and the presence of a subscriber in an IM system is the same to all watchers. This limitation arises because the decision of whether to block the phone number or the current status of presence of a subscriber is obtained from a fixed attribute associated with the subscriber. Data such as who is requesting the information or to whom the information is about to be revealed is not taken into account. There is also more dynamic data that could be taken into consideration when exposing the subscriber resources kept inside a network. This may include the time when the request is made, the location of the requester and the subscriber, the cost of the application, the balance in a subscriber's account, etc. At present, such information is not available to inquiring entities.

SUMMARY OF THE INVENTION

The invention solves the foregoing problems by providing a method and a system for making available telecommunication network resources associated with network subscribers and exposed by a Network Service Gateway (NSG) to clients of the NSG services based on stored subscriber availability preferences. The method and system can be implemented using an availability Policy Server that sits next to or inside of the NSG. The Policy Server interprets the stored availability preferences of subscribers in response to requests for subscriber information. These availability preferences are translated into a low-level policy rule language. The Policy Server implements a policy rule evaluator to evaluate the policies written in this language. Policies written in the low-level language are referred to as aPolicies (availability policies). An aPolicy receives as input a stream of events. Based on these events, the aPolicy may decide to take one or more actions. The output of an aPolicy is a stream of objects that may represent actions for execution by the NSG or clients thereof (e.g., such as send an IM), or events (e.g., such as a list of the devices that became available after the aPolicy was executed).

BRIEF DESCRIPTION OF THE DRAWING FIGURES

DETAILED DESCRIPTION OF PREFERRED EMBODIMENTS

Overview

Figure 1:
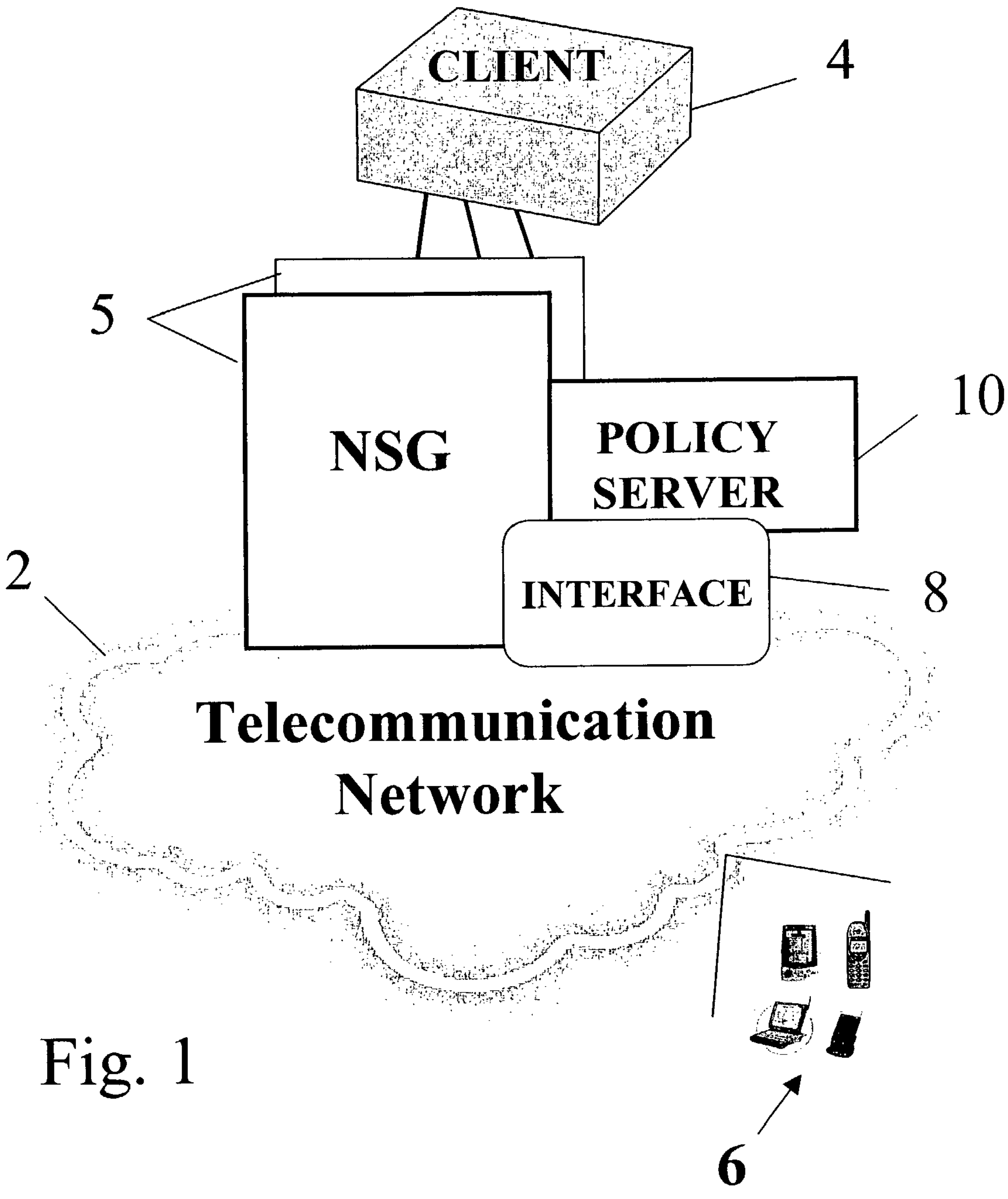
FIG. 1 is a functional block diagram of a Network Service Gateway comprising a Policy Server according to the invention.

Turning now to FIG. 1, an availability Policy Server (10) is shown which can sit next to or inside of a Network Service Gateway (NSG) (5) that administers the resources and data of subscribers (6) (mobile or non-mobile) who receive services from a telecommunication Network (2). It is the function of the Policy Server (10) to execute subscriber availability policies based on events that are provided as input, and to facilitate actions that allow Clients (4) of the NSG (5) to use the data and resources of subscribers in the Network (2) according to the subscriber availability preferences. The Policy Server (10) executes subscriber availability policies by interpreting the stored availability preferences of subscribers in response to requests for subscriber information.

The Policy Server (10) can be implemented as a stored software program that executes on the data processing platform that provides the NSG (5) or on a separate platform or processor. An interface (8), such as a GUI (e.g., web page) or a command line front end, may be provided by the Policy Server (10), or by the NSG (5), through which the subscriber availability preferences are provisioned. A single interface can be used, or in the alternative, there might exist different kinds of interfaces capturing different kinds of availability preferences and needs of the subscribers. For example, there can be one interface to capture availability preferences for presence and location, and another interface to define the access rights clients may have to subscriber data, such as addresses, contact lists, and other information that is hosted in the network.

The subscriber availability preferences are translated into a single low-level policy rule language, and the Policy Server (10) acts as a policy rule evaluator of the policies written in this language. Policies written in the low-level language are referred to as aPolicies (availability policies). An aPolicy receives as input a stream of events. Based on these events, the aPolicy may decide to take one or more actions. For example, an aPolicy that enforces the communication preferences of a subscriber may receive in the input stream an event indicating that a friend in the subscriber's contact list is present in the network. Based on this event, the aPolicy can generate an action indicating the change on availability of the subscriber's friends. A client application of the NSG (5) can be alerted of the action and run an application in one of the subscriber's devices that updates the list of present contacts that the subscriber sees in her device. Later on, the aPolicy may receive an event indicating that the friend is now off the network. The aPolicy can generate a new action that the application will use to update the present contact list.

When an aPolicy is invoked, the aPolicy receives a context that might be used during the enforcement of the aPolicy. This context can be explicit data, such as some static profile of a subscriber, e.g. e-mail address, surface address, work address, etc., as well as implicit data in the form of procedures or pointers to places where data can be retrieved, e.g. access to a directory server or a database or any attribute accessible from the network. The output of an aPolicy is a stream of objects representing either actions, such as send an IM, or events, such as a list of the devices that become available after the aPolicy has executed. Note that the actions are not typically executed by the aPolicy. The aPolicy preferably only decides which actions need to be executed. The NSG (10) or clients of the NSG (10) are the preferred entities for carrying out the execution of the actions.

Exemplary aPolicy Format

Figure 2:
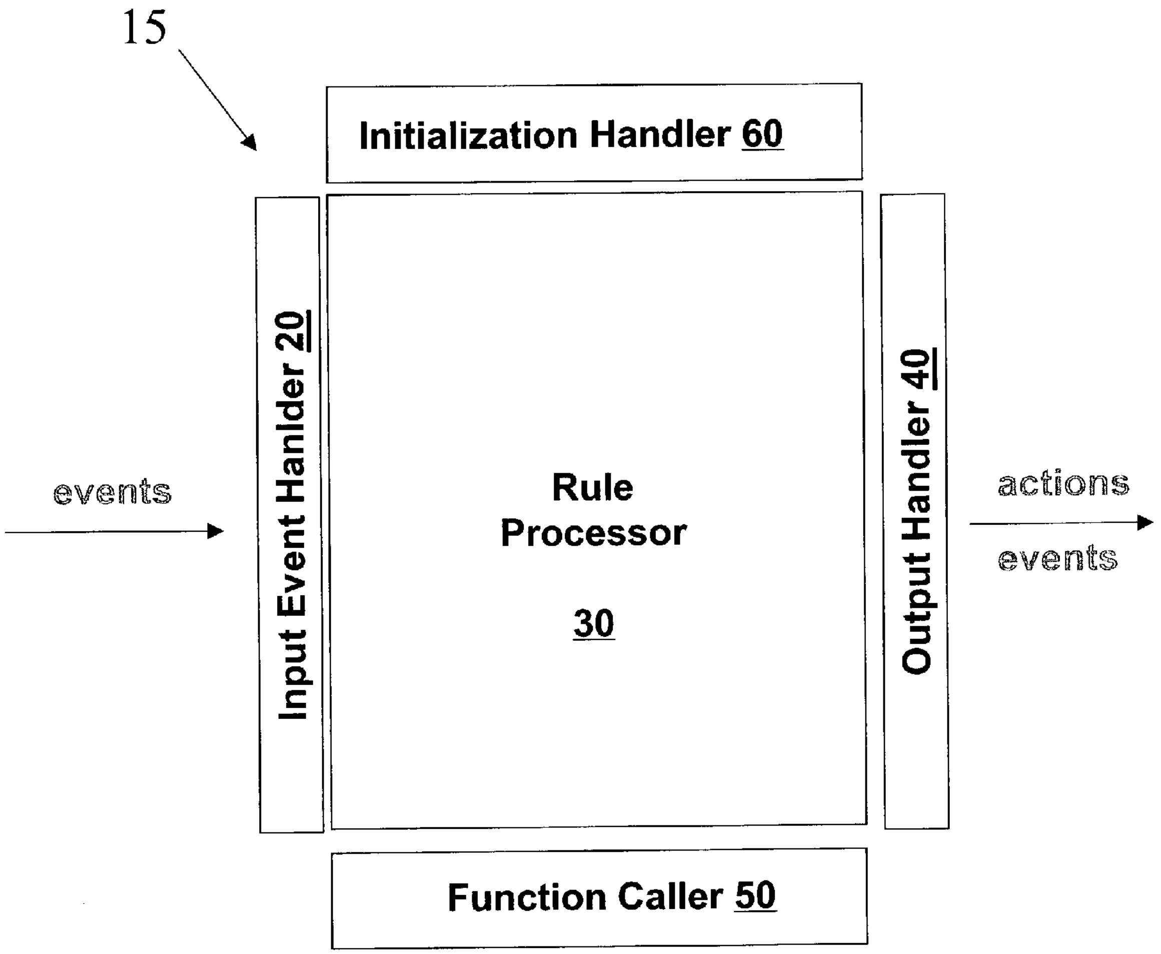
FIG. 2 is a functional block diagram of a Policy Evaluator within the Policy Server of FIG. 1.
Figure 3:
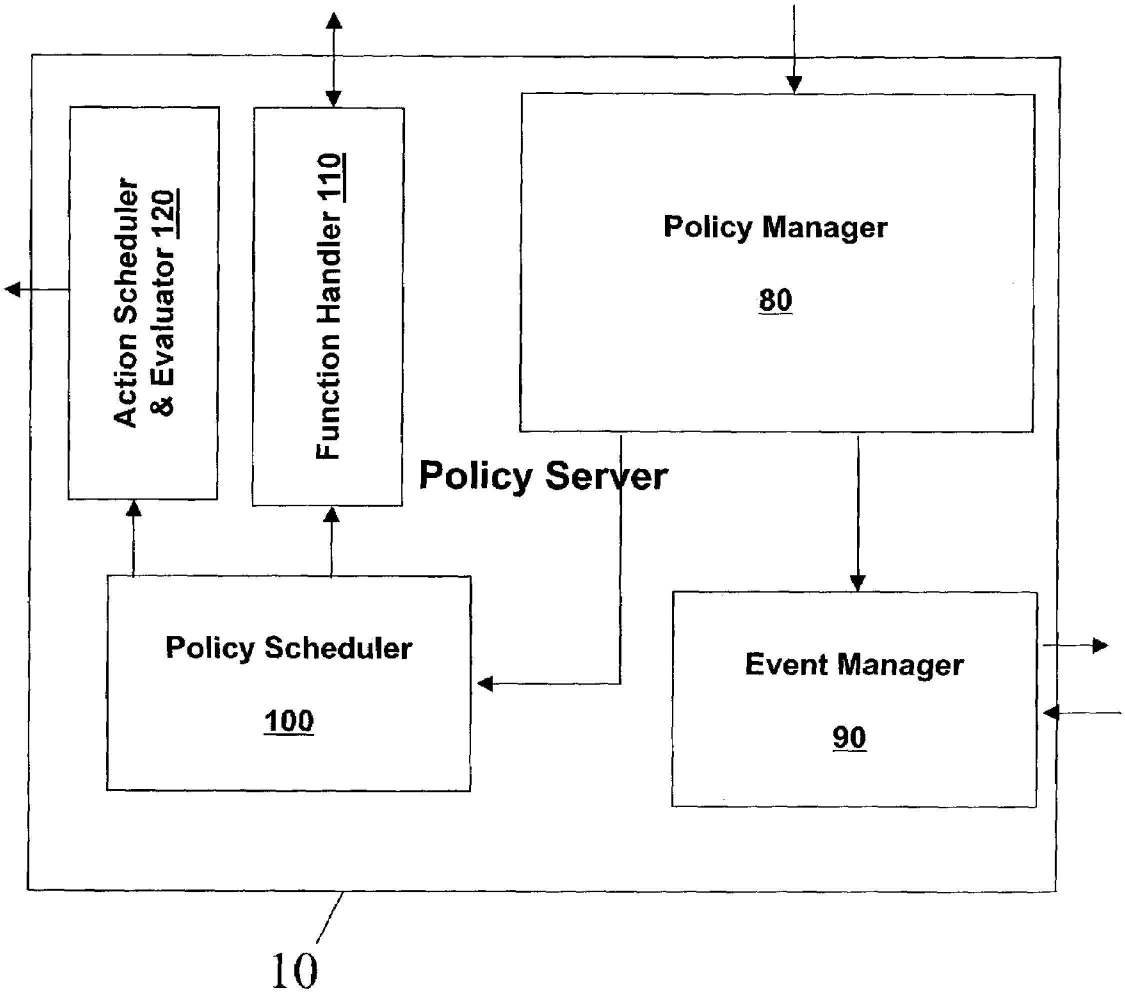
FIG. 3 is a functional block diagram of the Policy Server of FIG. 1.

Before describing the functional components of the Policy Server (10), the details of which are shown in FIG. 3, it will be helpful to describe how aPolicies can be constructed, and how they can be processed by way of policy evaluators, the details of which are shown in FIG. 2. The aPolicy now to be described, which is set forth by way of example only, syntactically has two sections, a declaration section and a rule section. The declaration section starts with the label [declaration] and has four subsections, (1) the link declaration, (2) the context declaration, (3) the events declaration and (4) the actions declaration. These declarations can come in any order. The declaration section can thus be an expression of the form:

```
[declarations]
    [links]
    <function name> = (class path, type);
    . . .
```

-continued

```
[events]
<object name>: <source>;
<object name>: <source>;
. . .
[actions]
<object name>;
<object name>;
. . .
[context]
<object name>;
<object name>;
. . .
```

The link subsection of the aPolicy declaration section declares how to access application-dependent functions required for evaluation of the aPolicy. This evaluation can be done through a static procedure implementation, so that if accesses to remote procedures outside the Policy Server (10) are required, the static procedure will handle them. The events and actions subsections of the aPolicy declaration section contain declarations of named objects for representing events and actions processed by the aPolicy. Each named object is a collection of attribute-value pairs. Similarly, the context subsection of the aPolicy declaration section declares named objects that are also a collection of attribute-value pair objects for representing context information that might be used during enforcement of the aPolicy.

The values used in the aPolicy declaration section can be numbers, characters, strings of based types, or vectors of based types. Object names can be sequences of letters, numbers and underscore symbols starting with a letter. Each name in the declaration should be unique. In the case of event objects, the source of the event indicates who generates the event. This can be indicated using a protocol such as URL (Uniform Resource Locator). The URL could be passed to the NSG (5) to be processed, but it might also be possible that if the Policy Server (10) can directly reach the event generators, it could register a trigger in order to receive an alert each time the event occurs. This latter approach may require preprocessing of the event to put it in a structure understood by the Policy Server.

The rule section of the exemplary aPolicy described herein starts with the label [rules] and can be set as blocks of rules of the form:

```
[rules]
    <composite event>:
    <rule>;
    <rule>;
```

A composite event is a sequence of event names (i.e. object names that appear in the event declaration section) separated by commas, some of them possibly preceded by "!". The sequence is surrounded with brackets:

{<event name>, <event name>, !<event name>, . . . }

The interpretation of a rule block is as follows: When all the events in the list not preceded by "!" simultaneously appear in the input stream, and none of the events preceded by "!" appear in the input stream, all the rules in the block will be considered for execution.

Rules may be two types, one that generates actions, and one that generates events:

If <events condition>; <state condition> then <action>

If <event condition>; <state condition> trigger <event>

An event condition refers to events that came into the input stream before any event in the composite event that labels the rule block. The event condition is a sequence of expressions of the following two forms:

previously(n) <event name>
previously(n) !<event name>
last(n) <event name>
last(n) !<event name> separated by commas. The argument n is a positive integer indicating the number of times that the aPolicy has been evaluated (each evaluation being referred to as a "step"). The condition "previously(n)<event name>" holds if the named event has occurred at some point in the past n steps. The condition "previously(n)<!event name>" holds if the named event has not occurred in the past n steps. The condition "last(n)<event name>" holds if the named event occurred exactly n steps behind the current step. The argument n is optional. If the argument n is not specified, the event has to have occurred in the immediately preceding step. The condition "last(n)<!event name>" holds if the named event did not occur in the history n steps behind the current step.

A state condition is a sequence of comparison expressions of the form:

Expression op Expression separated by commas. The comparison operator "op" is any of <, >, =, =/=. The Expression can be:

A numeric, character or string constant

A reference to an attribute of a context object: <context name>.<attribute name>

A reference to an attribute of an event mentioned in the label of the rule block: <event name>[k].<attribute name>

A reference to an attribute of an event mentioned in the event condition of the rule: <event name>[k].<attribute name>

Arithmetic expressions involving the previous type of expressions, or method calls provided or allowed by the rule evaluator whose attributes are expressions of the above types.

The index [k] in an event name is to differentiate multiple occurrences of the same event in the condition or the label. Events can be enumerated from left to right starting in the composite event and ending in the event condition. If the event occurs only once, the index can be dropped.

The action and the event portion of a rule are both expressions of the form:

<object name>(<attribute name>=Expression, <attribute name>=Expression, . . . )

The object name in an action must be an action name and the object name in an event must be an event name.

Note that any rule can refer to any object in the context subsection of the aPolicy declaration section, but only to the event objects named in the event condition of the rule itself or in the composite event labeling the block where the rule occurs.

Exemplary aPolicy Operational Semantics

The operational semantics of an exemplary aPolicy P can be described as a function of two arguments, a context C and a sequence of sets of event objects $[E_1,E_2,E_3, \ldots ,E_n]$ representing the input stream. The result of $P(C, [E_1,E_2,E_3, \ldots ,E_n])$ is a sequence of pairs of sets, $[(O_1,A_1), (O_2,A_2),(O_3,A_3), \ldots ,(O_n,A_n)]$ representing the output stream. The Os are sets of generated event objects and the $A_s$ are sets of generated action objects. This function is partial; it is not defined for all sequences of events. For any j, where $0<j<n$, the set $O_j$ must be a subset of $E_{j+1}$. That is, all the events generated by the aPolicy are in the next set of events in the input stream.

An action object a may be considered a member of the set of actions $A_n$ if the following conditions hold true:

There is a rule in P of the form If <condition> then <action>where the action name in <action> is the same action name of a There are instances in $E_n$ of all the events mentioned in the composite event labeling the block of the rule The <condition> evaluates to true in the context C and the sequence $[E_1,E_2,E_3, \ldots ,E_{n-1}]$ (note that the <condition>refers to previously occurring events that will appear in the $E_s$)

The attribute values of a are the values assigned to the attributes in the <action> part of the rule.

Similarly, an event object e may be considered member of the set of events $O_n$ if the following conditions hold:

There is a rule in P of the form If <condition> trigger <event> where the event name in <event> is the same event name of e There are instances in $E_n$ of all the events mentioned in the composite event labeling the block of the rule The <condition> evaluates to true in the context C and the sequence $[E_1,E_2,E_3, \ldots ,E_{n-1}]$ The attribute values of e are the values assigned to the attributes in the <event> part of the rule.

It is assumed that there are definitions for the function calls made in the expressions appearing in the condition, event and action parts of the rules being evaluated.

From a pure operational view, an aPolicy can be considered an "infinite" process. Once started, it may continue running as long as the same policy is in effect. However, aPolicies can be safely restarted when it is possible to ensure that the evaluation of the rules will not depend on past events. For example, if there are no event conditions in any of the rules it is safe to restart the aPolicy each time a set of events arrive at the input stream.

Policy Evaluators

Given that potentially every time a Client (4) of the NSG (5) will want to access a resource of a subscriber (6), an aPolicy must be checked, the execution of aPolicies must be fast. Hence, instead of having a general purpose rule evaluator for aPolicies, an individual policy evaluator can be generated for each aPolicy by compiling each aPolicy into a different Policy Evaluator program (15), as shown in FIG. 2, that runs as an execution thread in the Policy Server (10). Each Policy Evaluator (15) may have five components:

Initialization handler (60)
Input event handler (20)
Rule processor (30)
Output handler (40)
Function caller (50).

Initialization Handler

The initialization handler (60) handles the initialization of the aPolicy context and the creation of the necessary data structures to receive input events, and keeps the history of events required to evaluate the rules, as described below in connection with the input event handler (20).

Input Event Handler

The input event handler (20) is responsible for processing the input stream. It can be the same across all of the Policy Evaluators (15) implementing the aPolicies. Although the event conditions in the aPolicy rules could refer to events that have occurred in the past there is no need to keep the whole input stream history. An event e does not need to stay alive more than n steps if n is the largest integer m in all the expressions of the form last(m) e or previously(m) e. Furthermore, the history window required by the aPolicy is bounded by the largest n in all expressions of the form last(m) event or previously(m) event appearing in the aPolicy.

An algorithm suggested to implement the input stream history is the following. For an event n, let max(n) be the maximal m mentioned above. Let n be that max index. If the event does not appear, its max index is 0. In order to evaluate the conditions in the rules a history object is needed. How far back the history object remembers is given by the max (n) occurring in the aPolicy either in a "previously(n)" or "last (n)" statement. Assuming that this value is k, the module arithmetic of order (k+1) will be used. There will be a global counter (mod k+1) of the number of times the policy has been evaluated. As indicated above, this evaluation may be referred to as a "step." Each time a step finishes the counter is incremented (mod k+1). The history object may support two basic operations:

eventList previously(Name,n)/* returns all the occurrences (if any) of the event Name in the last n steps*/ event last(Name,n)/* returns the occurrences of event Name n steps before the current step*/.

The input to a step is a set of events (objects). Each of the objects in the step will be stored in the history (which can be represented by a circular array table of k+1 elements) together with two pieces of information: the step where they appear and an expiration object. The expiration object is a Boolean object that indicates if the object has expired so that can be removed from the history. At any time of the history, there are only 'k' unexpired objects stored in the array of k+1 positions. If the current step is step 'n', the object in position 'j' of the array will expire (j−n+(k+1) mod (k+1)) steps from the current step. Each time a step starts, the object in the position of the current step is declared expired and a new unexpired object is created and put it in that position.

The expiration object associated with an event in the input set is the object in position (n+m mod (k+1)), where m is the max index of the event (given by the array table).

Computation if an event E named e in the history is in the previously(e,j) can be performed as follows:

1. get an event from the history with name E.
2. if its expiration object has expired delete the event from the history and go to the first step.
3. get the step s where E occurred. If ((s−n+(k+1)) mod (k+1 ))<=j, E is member of previously(e,j).

Computation if an event E named e in the history is in a last(e,j) can be done as follows:

1. get an event from the history with name E.
2. if its expiration object has expired delete the event from the history and go to the first step.
3. get the step s where E occurred if ((s−n+(k+1)) mod (k+1))=j, E is member of last(e,j).

The events with max index 0 do not need to be stored in the history since their expiration occurs after the current step and can be destroyed after the execution of the step.

Rule Processor

The rule processor (30) can be generated based on the aPolicy rules and the initialization information in the aPolicy declaration section, and will mostly be code generated by compilation of the aPolicy rules. There is preferably an independent code block for each block of rules indexed by the events that trigger the block. Each block can be subdivided into sub-blocks, one for each rule. Standard compilation techniques may be used to generate the code. Events, actions and context objects will preferably all be extensions of an (object oriented programming) abstract class that provides implementation of the following methods:

createAttribute(AttributeName, AttributeValue)/* creates attributes to populate event, action and context objects */ addAttribute(Attribute)/* Adds attributes to event, action and context objects */ setAttribute(attribueName,attributeValue)/* modifies the value of an attribute assigned to an event, action or context object */ attributeValue getAttribute(attributeName)/* gets the value of an attribute assigned to an event, action or context object */

String[ ] getAttributeNames( )/* gets the names of all the attributes assigned to an event, action or context object */

String getName( )/* gets the name associated with an event, action or context object */.

Output Handler

The output handler (40) collects the events and actions to be output in each iteration of the aPolicy evaluation. It can be the same across all the Policy Evaluators (15).

Function Caller

The function caller (50) handles the interfaces with externally defined functions called during the evaluation of the aPolicy rule conditions. The code generated during compilation of the function caller (50) should include the necessary declarations in order to handle the application dependent functions invoked in the rules. This is obtained from the link section of the aPolicy.

Policy Evaluator Interfaces

The Policy Evaluator (15) of an aPolicy P may expose four interfaces:

Pevaluator(Context, ActionCallBack, FunctionHandler)/* initializes the evaluator of an aPolicy with the context, a reference to where to return the generated actions, and the location of the functions used by the aPolicy. The ActionCallBack function can be used by an Action Scheduler (120) (see below) of the Policy Server (10) to return a generated action to the requester of the evaluation of the aPolicy */ eval(Events E)/* evaluates one policy step */ replaceContext(Context C)/* replaces the current context with C */ resetEval( )/* clear the history of the evaluation */

Policy Server Architecture

Turning now to FIG. 3, the Policy Server (10) can be implemented with five functional components: a Policy Manager (80), a Policy Scheduler (100), an Action Scheduler (120), a Function Handler (110) and an Event Manager (90). Preferably, these different subsystems of the Policy Server (10) will be able to restart autonomously after failures and they will be able to handle failures and recoveries of the other components.

Policy Manager

The Policy Manager (80) is adapted to initializes all of the components of the Policy Server (10) and preferably exposes the following APIs:

PolicyScheduler getPolicySchedulerHandle( )/* provides access to the Policy Scheduler (100) to applications that need to schedule policies */

EventManagerHandler getEventManagerHandle( )/* provides access to the Event Manager (90) to applications that need to register or notify events */

Other OAM (Operation, Administration & Maintenance) APIs.

The Policy Manager (80) also compiles and stores aPolicies derived from subscriber availability preferences, and can provide a catalog of the action and functions and events available to aPolicies via the following additional APIs:

ActionNameList getActionList( )/* lists all the signatures and names of all the actions currently available in the Policy Server (10) */

FunctionNameList getFunctionList( )/* lists the signature and names of all functions currently available in the Policy Server (10) */

EventNameList getEventList( )/* lists the events registered with the Policy Server (10) as events that can be used in aPolicies for evaluation */

PolicyId createaPolicy(Subscriber Identification, aPolicy, Context)/* compiles and stores an aPolicy. The context (a string) identifies under which circumstances the aPolicy will be invoked. If the aPolicy being created is triggered by the occurrence of events, it registers the events with the Event Manager (90) so that the Event Manager can install watchers for the events and schedule the execution of the aPolicies when the events occur. */ aPolicy getaPolicy(Subscriber Identification, Context)/* returns the aPolicy associated with the identified subscriber for the given context */ removeaPolicy(Subscriber Identification, Context)/* clears the identified subscriber's aPolicy for the given context and unregisters any event that the creation of the aPolicy registered with the event manager */ evalPolicy(Subscriber Identification, Context, Events)/* this is the API exposed to the NSG (5) for requesting the evaluation of aPolicies (aPolicies can also be scheduled after the occurrence of an event, but this case will be handled by the Event Manager (90)) */.

Policy Scheduler

The Policy Scheduler (100) is adapted to receive a set of events and an aPolicy id and then decide when to evaluate the aPolicy. It preferably exposes the API:

schedulePolicyEval(Events, Action Callback, PolicyId)/* schedules policies for evaluation */.

At least two different models of aPolicy invocations can be implemented: reactive invocations and on demand invocations. A reactive invocation occurs when a trigger has been set in an event and the verification of an aPolicy is associated with that event. An example of this class of aPolicy is adding a subscriber name to a buddy list when the subscriber becomes available. The second model occurs when there are pre-established norms and procedures that require the verification of certain aPolicies before executing an action. An example of on-demand verification of a policy is verifying availability before sending a message to a subscriber. Accessing the Policy Scheduler (100) directly with "schedulePolicyEval( )" lets applications check aPolicies on demand. The Event Manager (90) (described below) will handle reactive invocations.

The Policy Scheduler (100) preferably has full control on the thread pool of aPolicies running in the Policy Server (10). They are given to the Policy Scheduler (100) by the Policy Manager (80). This does not prevent the Policy Scheduler (100) from replicating aPolicies to improve performance. The Policy Manager (80) may also request the Policy Scheduler (100) to permanently remove aPolicies from the pool. The Policy Scheduler (100) preferably provides two APIs to the Policy Manager (80) to manipulate policies:

addPolicy(PolicyId,PolicyObject)/* stores policies and policy evaluators in persistent storage */ removePolicy(PolicyId)/* removes policies and policy evaluators from persistent storage */.

Action Scheduler

The Action Scheduler (120) manages and schedules the execution of actions requested by aPolicies. It preferably exposes the API:

scheduleActionEval(Action A)/* schedules the execution of an action output by an aPolicy */.

The execution of an action can occur inside or outside the Policy Server (10). For the execution of actions outside the Policy Server (10), the role of the Action Scheduler (120) is to pass the name of the action and its arguments to an external entity. Components that are able to receive this kind of request must have an action driver that among other things should implement the following interface:

ExecAction(Action A)/* makes the actual notification or execution of the action */.

Note that actions executed inside the Policy Server (10) by the Action Scheduler (120) may use resources outside the Policy Server (10). However, the Action Scheduler (120) will own the thread where the action is executed.

Event Manager

The Event Manager (90) registers the events of interest with the Policy Server (10) or with external components (set triggers). It also handles an event queue and passes pairs of event sets and aPolicy handles to the Policy Scheduler (100). It receives registrations from the Policy Manager (80) of aPolicies interested in the notification of occurrences of particular events. The Event manager (90) preferably exposes the following APIs:

Queue(Event E)/* adds an event to the input queue of the event manager for processing/*

EventRegistration(EventName N, PolicyId PId)/* registers the interest of aPolicies for receiving event notifications */.

Components that are interested in reporting events to the Policy Server (10) must have an event driver that among other things should implement the following interface:

RegisterEvent(EventName E)/* registers an event of interest with the generator of events */

Function Handler

The Function Handler (110) executes the functions called from Policy Evaluators (15) during rule processing. If these functions require communication with entities outside the Policy Server (10) (such as databases or network probes) to evaluate, the Function Handler (110) preferably takes care of all the communication protocols. This allows for the condition of any aPolicy to be able to verify the value of any attribute accessible from the Policy Server, which includes the NSG (5) and thus the entire Network (2).

Message Flows

Following are exemplary process flows that may be used to implement and enforce availability preferences and needs of user resources hosted by the Telecommunication Network 2. The described process flows pertain to (1) setting subscriber availability preferences, (2) application requests for subscriber information with aPolicy checking prior to honoring the requests, and (3) executing an aPolicy after occurrence of an event.

Setting Subscriber Availability Preferences

Figure 4:
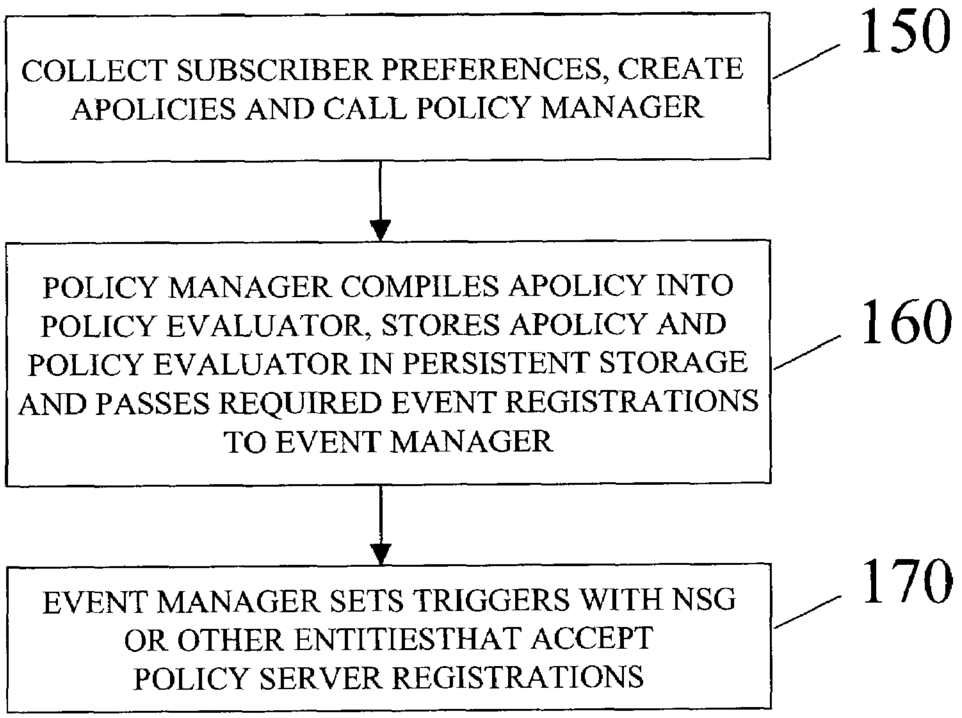
FIG. 4 is a flow diagram showing method steps for setting subscriber availability preferences.

With reference now to FIG. 4, the following processing steps may be followed to set subscriber availability preferences:

1. In a first step (150), the operator/application associated with a Client (4) collects a subscriber's preferences, transforms them into one or more aPolicies and calls createaPolicy( ) in the Policy Manager (80) of the Policy Server (10) of FIG. 2.

2. In a second step (160), the Policy Manager (80) compiles the aPolicy into a Policy Evaluator (15), stores the aPolicy and the Policy Evaluator in a persistent storage device, and passes any required event registrations to the Event Manager (90) by calling EventRegistration( ).
3. In a third step (170), the Event Manager (90) may set triggers with the NSG(5)or other entities that accept Policy Server registrations. Examples of other entities are Location and Presence brokers, the system clock in the NSG, etc.

Subscriber Information Request Processing

Figure 5:
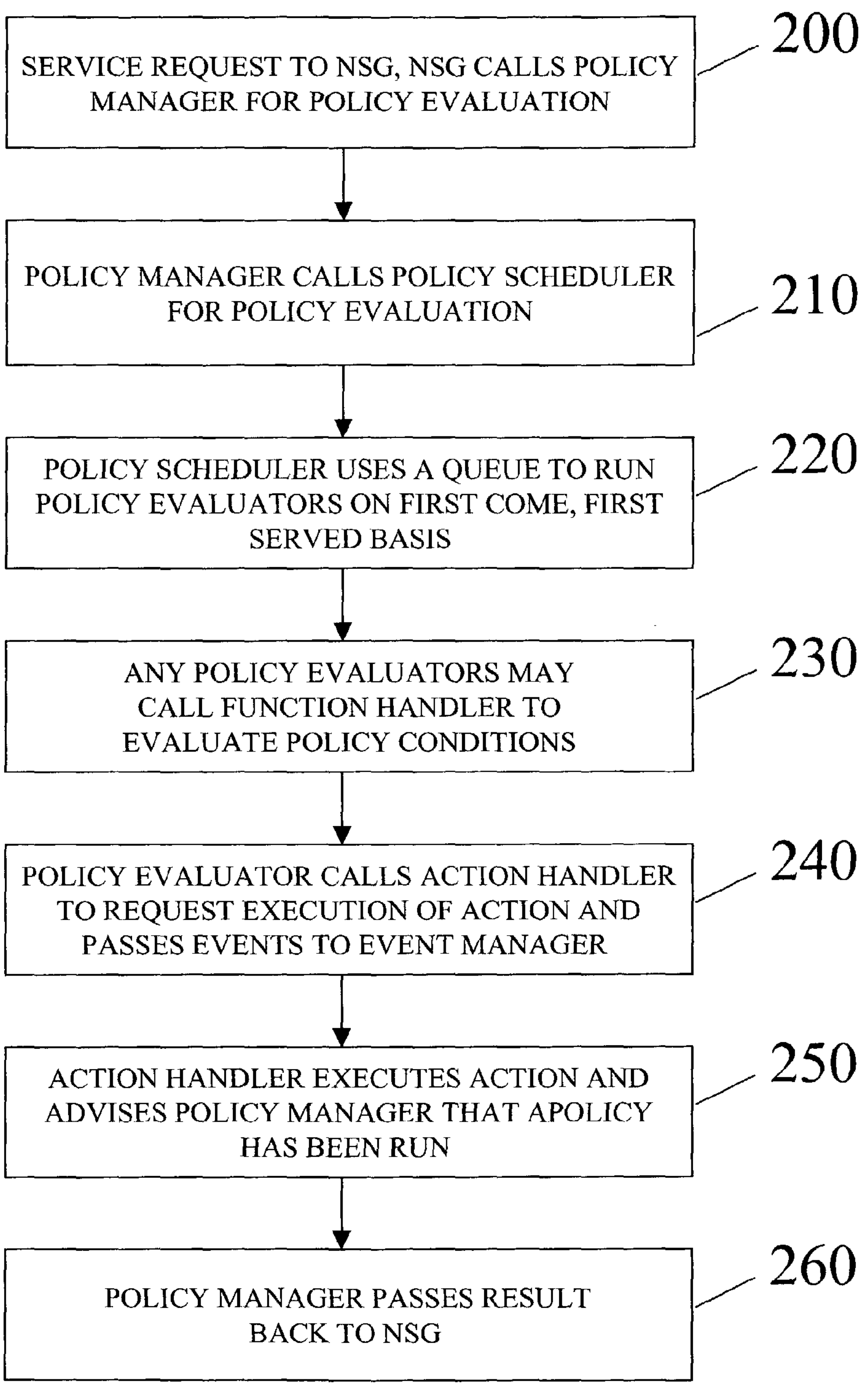
FIG. 5 is a flow diagram showing method steps for serving requests for subscriber data and resources based on subscriber preferences.

A Client (4) of the NSG (5) makes requests for subscriber information and the NSG (5) may check aPolicies before honoring the requests. With reference now to FIG. 5, the following process flow may be used:

1. In a first step (200), a client application makes a service request to the NSG (5) and the NSG (5) calls evalpolicy( ) in the Policy Manager (80) of the Policy Server (10), providing the subscriber and the context of the request. The context may include information such as current time, data on present devices of the subscriber, etc.
2. In a second step (210), the Policy Manager (80) passes the aPolicy Id to the Policy Scheduler (100) to execute by calling schedulePolicyEval( ).
3. In a third step (220), the Policy Scheduler (100) uses a queue to run the Policy Evaluators (15) in a first come/first served mode of service. A Policy Evaluator (15) is called by the Policy Scheduler (100) using the function eval(Events E). The service mode can change according to priority of service agreements between the clients and the NSG (5).
4. In a fourth step (230), any of the Policy Evaluators (15) may call the Function Handler (110) to evaluate aPolicy conditions.
5. In a fifth step (240), after evaluation of the aPolicy by its Policy Evaluator (15), the Policy Evaluator (15) calls scheduleActionEval( ) in the Action Scheduler (120) to request the execution of an action by the Action Scheduler, and also passes events generated by execution of the aPolicy to the Event Manager (90) by calling Queue (Event E).
6. In a sixth step (250), the execution of the action by the Action Scheduler (120) informs the result of running the aPolicy to the Policy Manager (80).
7. In a seventh step (260), the Policy Manager (80) passes the result back to the NSG.

Execution of aPolicy After Occurrence of an Event

Figure 6:
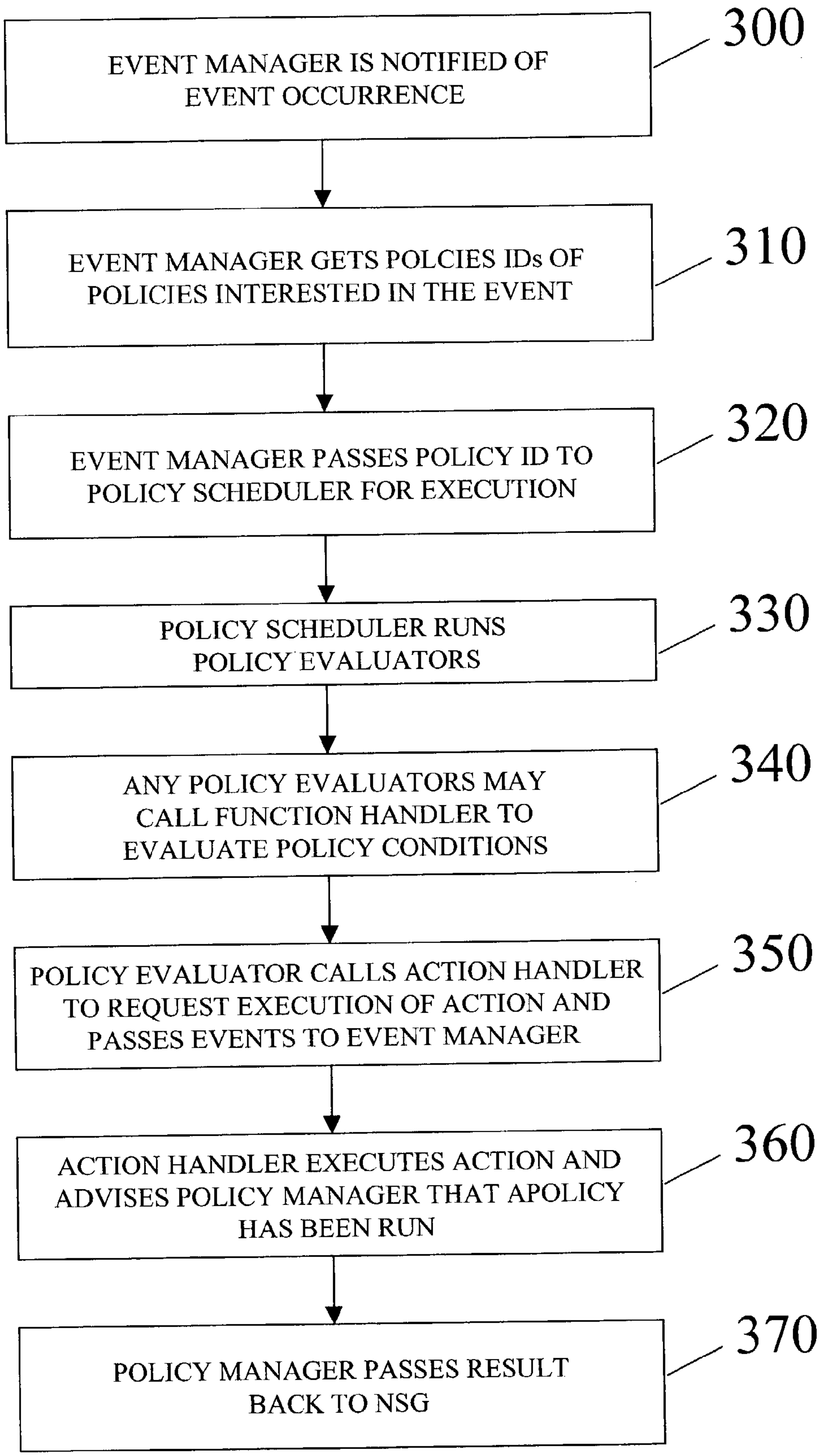
FIG. 6 is a flow diagram showing method steps for execution of a policy after occurrence of an event.

With reference now to FIG. 6, the last flow control is the execution of an aPolicy after the occurrence of an event:

1. In a first step (300), the Event Manager (90) is notified of the occurrence of an event via its Queue(Event E) API.
2. In a second step (310), the Event Manager (90) gets the policy Ids of the aPolicies interested in that event. This information can be stored in a hash table during the registration of the event by the Policy Manager (80).
3. In a third step (320), the Event Manager (90) passes the policy Id to the Policy Scheduler (100) to execute by calling schedulePolicyEval( ).
4. In a fourth step (330), the Policy Scheduler (100) uses a queue to run the Policy Evaluators (15) in a first come/first served mode of service. Again, a Policy Evaluator (15) is called by the Policy Scheduler (100) using the function eval(Events E). The service mode can change according to priority of service agreements between the clients and the NSG (5).
5. In a fifth step (340), any of the Policy Evaluators (15) may call the Function Handler (110) to evaluate aPolicy conditions.
6. In a sixth step (350), after the evaluation of the aPolicy, its Policy Evaluator (15) requests the execution of an action to Action Scheduler (120) by calling scheduleActionEval( ), and also pass events generated by execution of the aPolicy to the Event Manager (90) by calling Queue(Event E).
7. In a seventh step (360), the execution of the action by the Action Scheduler (120) informs the result of running the aPolicy to the Policy Manager (80).
8. In an eighth step (370), the Policy Manager (80) passes the result back to the NSG (5) if the action execution needs to be completed outside the Policy Server (10).

Accordingly, a method and system have been disclosed for enforcing availability preferences and needs of user resources hosted by telecommunication networks. While various embodiments of the invention have been shown and described, it should be apparent that many variations and alternative embodiments could be implemented in accordance with the invention. It is understood, therefore, that the invention is not to be in any way limited except in accordance with the spirit of the appended claims and their equivalents.

What is claimed is:

1. A method for use in a telecommunications network for implementing subscriber availability preferences that govern how clients of the network can use data and resources associated with subscribers of the network, comprising:

establishing a set of availability preferences for a subscriber;

said availability preferences being based on one or more attribute values;

translating said availability preferences into one or more availability policies, wherein said policies evaluate events and implement rules based on said events, and implementation of said rules produces actions and events;

receiving a service request for subscriber data and resources;

generating, at a processor, at least one evaluator to evaluate each of the one or more availability policies by compiling each policy into a different policy evaluator program, wherein each generated evaluator evaluates one availability policy;

associating each evaluator with one availability policy; and evaluating, at the processor, each availability policy using the associated evaluator when said availability policy corresponds to the received service request, wherein evaluating an availability policy comprises determining the number of times that the availability policy has been evaluated to determine whether to update an event condition; and serving requests from said clients for said subscriber data and resources according to said preferences and the evaluated availability policy.

2. A method in accordance with claim 1 wherein said attribute values include dynamic data comprising location of subscribers, clients and resources.

3. A method in accordance with claim 1 further including initialization handling to initialize policy contexts, prepare to receive input events and maintain an event history.

4. A method in accordance with claim 1 further including rule processing to execute said policies based on said events.

5. A method in accordance with claim 1 further including output handling to collect events and actions produced by a policy for output.

6. A method in accordance with claim 1 further including function calling to call functions required for policy execution.

7. A system for use in a telecommunication network for implementing subscriber availability preferences that govern how clients of the network can use data and resources associated with subscribers of the network, comprising:

a processor operable to execute software; and the software operable to:

establish a set of availability preferences for a subscriber;

said preferences being based on attribute values;

translate said availability preferences into one or more availability policies, wherein said policies evaluate events and implement rules based on said events;

receive a service request for subscriber data and resources;

generated, at the processor, at least one evaluator to evaluate each of the one or more availability policies by compiling each policy into a different policy evaluator program, wherein each generated evaluator evaluates one availability policy;

associate each evaluator with one availability policy; and evaluate, at the processor, each availability policy using the associated evaluator when said availability policy corresponds to the received service request, wherein evaluating an availability policy comprises determining the number of times that the availability policy has been evaluated to determine whether to update an event condition; and serve requests from said clients for said subscriber data and resources according to said preferences and the evaluated availability policy;

a policy evaluator adapted to implement policy rules and produce actions and events, wherein said policy evaluator comprises an input event handler operable to generate an event history.

8. The system in accordance with claim 7 wherein said attribute values include dynamic data comprising location of subscribers, clients and resources.

9. The system in accordance with claim 7 wherein said policy evaluator includes an initialization handler adapted to initialize policy contexts, prepare to receive input events and maintain an event history.

10. The system in accordance with claim 7 wherein said policy evaluator includes a rule processor adapted to execute said policies based on said events.

11. The system in accordance with claim 7 wherein said policy evaluator includes an output handler adapted to collect events and actions produced by a policy for output.

12. The system in accordance with claim 7 wherein said policy evaluator includes a function caller adapted to call functions required for policy execution.

13. A system for implementing subscriber availability preferences that govern how clients of the network can use data and resources associated with subscribers of the network, comprising:

a processor operable to execute software; and the software comprising:

a policy manager adapted to translate subscriber availability preferences into one or more availability policies, said preferences being based on attribute values, said policies evaluate events and implement rules based on said events, wherein implementation of said rules produces actions and events;

a policy scheduler adapted to receive events and policy identifiers from said policy manager and execute policies associated with said policy identifiers to produce events and actions;

an action scheduler adapted to manage and schedule execution of actions produced by said policy scheduler;

an event manager adapted to register events in association with policies;

a function handler adapted to execute functions called during policy rule processing; and a compiler operable to:

generate at least one evaluator to evaluate each availability policy of the one or more availability policies by compiling each policy into a different policy evaluator program, wherein each generated evaluator evaluates one availability policy; and associate each evaluator with one availability policy, wherein the policy manager is further operable to evaluate each availability policy using the associated evaluator and evaluating an availability policy comprises determining the number of times that the availability policy has been evaluated to determine whether to update an event condition.

14. A method for use in a telecommunications network for implementing subscriber availability preferences that govern how clients of the network can use data and resources associated with subscribers of the network, comprising:

establishing a set of availability preferences for a subscriber, said availability preferences being based on one or more attribute values;

translating said availability preferences into a plurality of availability policies, wherein the plurality of availability policies evaluate events and implement rules based on said events, and implementation of said rules produces actions and events;

receiving a service request for subscriber data and resources;

generating, at a processor, at least one evaluator to evaluate each of the plurality of availability policies by compiling each policy into a different policy evaluator program, wherein each generated evaluator evaluates one availability policy;

associating each evaluator with one availability policy;

applying the associated evaluator to evaluate, at the processor, one of the plurality of availability policies using the associated evaluator when said availability policy corresponds to the received service request, wherein evaluating one of the plurality of availability policies comprises determining the number of times that an availability policy has been evaluated to determine whether to update an event condition; and serving requests from said clients for said subscriber data and resources according to said preferences and the evaluated availability policy.

15. A method for use in a telecommunications network for implementing subscriber availability preferences that govern how clients of the network can use data and resources associated with subscribers of the network, comprising:

establishing a set of availability preferences for a subscriber;

said availability preferences being based on one or more attribute values;

translating said availability preferences into one or more availability policies, wherein said policies evaluate events and implement rules based on said events, and implementation of said rules produces actions and events;

receiving a service request for subscriber data and resources;

generating, at a processor, separate evaluators to evaluate each of the one or more availability policies by compiling each policy into a different policy evaluator program, wherein each generated evaluator evaluates one availability policy;

associating each evaluator with one availability policy;

evaluating, at the processor, each availability policy using the associated evaluator when said availability policy corresponds to the received service request, wherein evaluating an availability policy comprises determining the number of times that the availability policy has been evaluated to determine whether to update an event condition; and serving requests from said clients for said subscriber data and resources according to said preferences and the evaluated availability policy.

* * * * *